US008455389B2

United States Patent
Liwanga-Ehumbu et al.

(10) Patent No.: US 8,455,389 B2
(45) Date of Patent: Jun. 4, 2013

(54) HYDROCRACKING CATALYST AND A DIESEL PRODUCTION PROCESS

(75) Inventors: Aubin-Maurice Liwanga-Ehumbu, Sasolburg (ZA); Jacobus Lucas Visagie, Sasolburg (ZA); Dieter Otto Leckel, Vaalpark (ZA)

(73) Assignee: Sasol Technology (Pty) Ltd., Johannesburg (ZA)

( * ) Notice: Subject to any disclaimer, the term of this patent is extended or adjusted under 35 U.S.C. 154(b) by 2472 days.

(21) Appl. No.: 10/296,348

(22) PCT Filed: May 24, 2001

(86) PCT No.: PCT/ZA01/00064
§ 371 (c)(1),
(2), (4) Date: Apr. 3, 2003

(87) PCT Pub. No.: WO01/90280
PCT Pub. Date: Nov. 29, 2001

(65) Prior Publication Data
US 2003/0173253 A1    Sep. 18, 2003

Related U.S. Application Data

(60) Provisional application No. 60/207,121, filed on May 25, 2000, provisional application No. 60/207,635, filed on May 25, 2000.

(30) Foreign Application Priority Data

May 25, 2000 (ZA) .................................. 2000/2594
May 25, 2000 (ZA) .................................. 2000/2595

(51) Int. Cl.
*B01J 21/12*    (2006.01)

(52) U.S. Cl.
USPC ........... 502/261; 502/240; 502/246; 502/248; 502/254; 502/257

(58) Field of Classification Search
USPC ...... 208/108, 111.05, 111.2, 111.35; 502/241
See application file for complete search history.

(56) References Cited

U.S. PATENT DOCUMENTS

| | | | | |
|---|---|---|---|---|
| 3,360,457 A * | 12/1967 | Peck et al. | ...................... | 208/59 |
| 3,617,485 A * | 11/1971 | Kittrell | ........................... | 208/59 |
| 3,697,444 A * | 10/1972 | Van Klinken et al. | ........ | 502/238 |
| 3,880,748 A * | 4/1975 | Sawyer | ........................... | 208/136 |
| 5,021,142 A * | 6/1991 | Bortz et al. | ..................... | 208/58 |
| 5,187,138 A * | 2/1993 | Davis | ............................ | 502/255 |
| 5,254,518 A * | 10/1993 | Soled et al. | ................... | 502/241 |
| 5,378,348 A * | 1/1995 | Davis et al. | ..................... | 208/27 |
| 5,750,819 A * | 5/1998 | Wittenbrink et al. | ......... | 585/734 |
| 6,204,426 B1 * | 3/2001 | Miller et al. | ................... | 585/739 |
| 6,635,681 B2 * | 10/2003 | Moore et al. | ................... | 518/700 |
| 2003/0019788 A1 * | 1/2003 | Benazzi et al. | ................. | 208/57 |
| 2003/0038059 A1 * | 2/2003 | Zanibelli et al. | ............... | 208/213 |
| 2003/0057135 A1 * | 3/2003 | Benazzi et al. | ................. | 208/57 |
| 2003/0119924 A1 * | 6/2003 | Moore et al. | ................... | 518/728 |

* cited by examiner

*Primary Examiner* — Tam M Nguyen
(74) *Attorney, Agent, or Firm* — Occhiuti Rohlicek & Tsao LLP

(57) ABSTRACT

The invention provides an amorphous hydrocracking catalyst for conversion of a hydrocarbon feed having a fraction above the diesel boiling range to diesel and a process using said catalyst. The catalyst includes $Al_2O_3$—$SiO_2$ support, a noble catalytically active metal which is active for hydrocracking of a hydrocarbon above the diesel boiling range and a transition metal oxide selected from group V, VI and VII.

9 Claims, No Drawings

HYDROCRACKING CATALYST AND A DIESEL PRODUCTION PROCESS

CROSS REFERENCE TO RELATED APPLICATIONS

This application is a National Stage of International Application No. PCT/ZA01/00064, filed May 24, 2001, which claims priority to South African Application No. 2000/2594, filed May 25, 2000, South African Application No. 2000/2595, filed May 25, 2000, U.S. Provisional Application No. 60/207,121, filed May 25, 2000, and U.S. Provisional Application No. 60/207,635, filed May 25, 2000. The contents of the prior applications are incorporated herein by reference in their entirety.

FIELD OF THE INVENTION

The invention relates to a hydrocracking catalyst suitable for the production of diesel boiling range hydrocarbons and to a diesel production process using said catalyst.

BACKGROUND TO THE INVENTION

The applicant is aware that presently in order to produce diesel from a hydrocarbon feed including a fraction having a boiling point in excess of the diesel boiling range by hydrocracking a high recirculation ratio is required thereby leading to reduced viability of the production of said diesel. The high recirculation ratio is necessitated, for amongst other reasons, by the relatively low conversions and yields to the desired products The applicant is further aware that diesel for commercial use should preferably have good cold flow properties, a low cloud point, and a cetane number in excess of 40.

The applicant is also aware that existing hydrocracking catalysts used presently for the production of diesel from a hydrocarbon feed having a fraction having a boiling point above the diesel boiling range include commercially available amorphous $Ni/W/Al_2O_3SiO_2$ catalysts as well as $Ni/Mo/Al_2O_3SiO_2$ catalysts which require a high recirculation ratio as described above and amorphous $Pt/Al_2O_3SiO_2$ which is a hydrocracking and dewaxing catalyst which also requires a high recirculation ratio as described above in order to produce said diesel.

The applicant is also aware of an article by S Rajagopal, J. A. Marzari and R Miranda entitled Silica-Alumina-Supported Mo Oxide Catalysts: "Genesis and Demise of Brönsted-Lewis Acidity", which article was published in the Journal of Catalysis 151, 192-203 (1995). The entire article is incorporated in this specification by reference as if specifically reproduced here.

In the aforementioned article the authors summarise that the ratio of Brönsted to Lewis acid sites concentration (B/L) increases with $SiO_2$ content in the support and reaches a maximum for $SiO_2:Al_2O_3$ of 3:1 by weight. For alumina rich supports B/L increases continuously with $MoO_3$ loading because of the generation of new Brönsted acid sites and decrease of Lewis acid sites, up to a theoretical maximum of 12 wt % $MoO_3$. The article does not propose the manufacture of a catalyst of the type of this invention nor would the results set out in the article lead a man skilled in the art to conclude that a catalyst in accordance with this invention could be manufactured.

In this specification, unless the context clearly indicates to the contrary, the term conversion is used to indicate the conversion of the hydrocarbon feed to reaction products on a single pass through the reactor i.e. without recycle of reactor bottoms.

Thus, after prolonged and laborious experimentation and development work on diesel production the applicant now proposes a new catalyst and a new diesel production process in accordance with the invention.

SUMMARY OF THE INVENTION

The invention provides an amorphous hydrocracking catalyst for conversion of at least a portion of a hydrocarbon feed having a fraction above the diesel boiling range to diesel, said catalyst including:
  a $Al_2O_3$—$SiO_2$ support;
  a noble catalytically active metal which is active at least for the hydrocracking of a hydrocarbon above the diesel boiling range; and
  a transition metal oxide wherein the transition metal is selected from Group V, Group VI and Group VII transition metals.

The ratio of $SiO_2$ to $Al_2O_3$ in the support may be between 1:4 and 4:1.

The ratio of $SiO_2$ to $Al_2O_3$ in the support may be between 1:2 and 7:2.

The ratio of $SiO_2$ to $Al_2O_3$ in the support may be between 2:4 and 7:2.

The ratio of $SiO_2$ to $Al_2O_3$ in the support may be about 3:1.

The catalytically active noble metal may be Pt, Pd, Ir, or Rh.

The catalytically active noble metal is typically Pt.

The catalytically active noble metal may be present at between 0.1% to 5% of the weight of the catalyst.

The catalytically active noble metal is typically present at between 0.5% to 1.5% of the weight of the catalyst.

The catalytically active noble metal is usually about 1.2% of the weight of the catalyst.

The transition metal oxide is typically a Group Vi transition metal oxide, for example, $MoO_3$.

The transition metal oxide may be between about 0.5% and 15% of the catalyst weight.

The transition metal oxide may be between about 1.5% and 12% of the catalyst weight.

Typically the transition metal oxide is about 2% of the catalyst weight.

In one embodiment the catalyst is $Pt/MoO_3/Al_2O_3SiO_2$ having about 1.2 wt % Pt and about 2 wt % $MoO_3$, and a $SiO_2$ to $Al_2O_3$ weight ratio of about 3:1.

The catalyst is a non-sulphided catalyst.

According to a further aspect of the invention there is provided an amorphous hydrocracking catalyst for conversion of at least a portion of a hydrocarbon feed having a fraction above the diesel boiling range to diesel, said catalyst having an acidity of between 0.1 and 0.9 mmol $NH_3$/g catalyst.

Typically, said catalyst has an acidity of between 0.25 and 0.6 mmol $NH_3$/g catalyst.

Typically, said catalyst has an acidity when freshly prepared of 0.38 mmol $NH_3$/g catalyst Typically, said catalyst has an acidity when used (spent) of 0.45 mmol $NH_3$/g catalyst The catalyst may have a Brönsted/Lewis ratio (B/L) of between 0.3 and 1.2.

Typically, said catalyst may have a Brönsted/Lewis ratio of 0.44.

The applicant believes that the B/L ratio of the support of the catalyst, which is substantially higher than some prior art hydrocracking catalysts, results in the catalyst of the invention favouring a tertiary to tertiary cracking mechanism, also called a Type A cracking mechanism, which cracking mechanism is substantially faster than the Type B1 and B2 cracking mechanisms.

It is believed that a high B/L content on the amorphous support is important as the alkene receives a proton from the support, then transforms into a carbocaton.

Isomerization is an important step in the hydrocracking mechanism as a linear paraffin molecule has typically to be isomerized three times before the dominant A-type hydrocracking takes place.

Over bifunctional catalysts, it has been found that type A hydrocracking is by far the fastest reaction; 375 times faster than type B1 and 1050 times faster than type B2 hydrocracking The applicant further believes that the non-sulphided nature of the catalyst of the invention is advantageous in a hydrocarbon processing stream where sulphur levels are very low or absent, such as a Fischer-Tropsch process in which there is typically no or little sulphur in the feedstream and thus sulphur removal is not provided for.

According to a further aspect of the invention there is provided a process for conversion of at least a portion of a hydrocarbon feed having a component above the diesel boiling range to diesel, said process including contacting under conversion temperatures and pressures said hydrocarbon feed with a catalyst including:
  a $Al_2O_3SiO_2$ support;
  a noble catalytically active metal which is active at least for the hydrocracking of a hydrocarbon above the diesel boiling range; and
  a transition metal oxide wherein the transition metal is selected from Group V, Group VI and Group VII transition metals.

The ratio of $SiO_2$ to $Al_2O_3$ in the support may be between 1:4 and 4:1.

The ratio of $SiO_2$ to $Al_2O_3$ in the support may be between 1:2 and 7:2.

The ratio of $SiO_2$ to $Al_2O_3$ in the support may be between 2:4 and 7:2.

The ratio of $SiO_2$ to $Al_2O_3$ in the support may be about 3:1.

The catalytically active noble metal may be Pt, Pd. Ir, or Rh.

The catalytically active noble metal is typically Pt.

The catalytically active noble metal may be present at between 0.1% to 5% of the weight of the catalyst.

The catalytically active noble metal is typically present at between 0.5% to 1.5% of the weight of the catalyst.

The catalytically active noble metal is usually about 1.2% of the weight of the catalyst.

The transition metal oxide may be any Group VI b (Group 6) oxide, typically $MoO_3$ The transition metal oxide may be between about 0.5% and 15% of the catalyst weight.

The transition metal oxide may be between about 1.5% and 12% of the catalyst weight.

Typically the transition metal oxide is about 2% of the catalyst weight.

In one embodiment the catalyst is $Pt/MoO_3/Al_2O_3SiO_2$ having about 1.2 wt % Pt and about 2 wt % $MoO_3$, and an $SiO_2$ to $Al_2O_3$ weight ratio of about 3:1.

The catalyst is a non-sulphided catalyst.

The process may be carried out at a temperature of between 250° C. and 450° C.

The process may be carried out at a temperature of between 330° C. and 390° C.

The process may be carried out at temperature of between about 350° C. and 380° C.

Typically the process is carried out at between 360° C. to 370°, usually 370° C.

The process may be carried out a pressure of between 10 and 200 Bar, although a typical range is between 15 and 70 Bar.

The process may be carried out at 70 Bar where a high diesel to naphtha ratio of above 6 is required at a conversion rate of above 60%.

The process may be carried out at a pressure of about 70 Bar and at a temperature of about 370° C. to give a diesel to naphtha ratio of about 6.4 at a conversion of about 70%, said diesel having a cloud point of about −19° C.

The process may be carried out without recycle of a bottoms fraction.

The process may be carried out with a recycle ratio of bottoms fraction from the reactor to fresh hydrocarbon feed of from 4:1 to 1:9 (20%/-90% conversion)

The process may be carried out with a volumetric $H_2$ to hydrocarbon feed ratio of between 800:1 and 3000:1, typically 1000:1 to 1500:1.

The process may be carried out with a weight hourly space velocity (whsv) of between $0.25\,h^{-1}$ and $1.5\,h^{-1}$, typically $0.5\,h^{-1}$ and $1\,h^{-1}$.

The diesel and naphtha products of the process may be produced at a ratio of at least 6:1, typically 6.4:1.

The conversion to diesel may be at least 60%, typically 70% and even as high as 80%.

In one embodiment, the diesel to naphtha ratio is about 6.4:1 at a conversion to diesel of 70% when the process is carried out at 370° C. and a pressure of 70 Bar.

Typically the hydrocarbon feed is predominantly a wax feed, for example a Fischer-Tropsch wax.

According to yet a further aspect of the invention, there is provided a process for conversion of at least a portion of a hydrocarbon feed having a component above the diesel boiling range to diesel, said process including contacting under conversion temperatures and pressures said hydrocarbon feed with a conversion catalyst, wherein product fractions of the process include:
  a naphtha fraction;
  a diesel fraction; and
  a bottoms fraction which predominantly contains hydrocarbons having a boiling range above the diesel boiling range;
wherein the diesel to naphtha ratio is at least 6 when the conversion of hydrocarbon feed is at least 60%.

The diesel to naphtha ratio may be between 6 and 7, typically 6.4 at a conversion of 70% when the process is carried out at 370° C. and at a pressure of 70 Bar.

The process may include the recycling of the bottoms fraction wherein the recycle ratio of bottoms fraction to fresh hydrocarbon feed is less than 4:1, typically less than 3:7.

In one embodiment there is no recycling of the bottoms fraction.

The conversion catalyst may include:
  a $Al_2O_3$—$SiO_2$ support;
  a noble catalytically active metal which is active at least for the hydrocracking of a hydrocarbon above the diesel boiling range; and a transition metal oxide wherein the transition metal is selected from Group V, Group VI and Group VII transition metals.

The ratio of $SiO_2$ to $Al_2O_3$ in the support may be between 1:4 and 4:1.

The ratio of $SiO_2$ to $Al_2O_3$ in the support may be between 1:2 and 7:2.

The ratio of $SiO_2$ to $Al_2O_3$ in the support may be between 2:4 and 7:2.

The ratio of $SiO_2$ to $Al_2O_3$ in the support may be about 3:1.

The catalytically active noble metal may be Pt, Pd, Ir, or Rh.

The catalytically active noble metal is typically Pt.

The catalytically active noble metal may be present at between 0.1% to 5% of the weight of the catalyst.

The catalytically active noble metal is typically present at between 0.5% to 1.5% of the weight of the catalyst.

The catalytically active noble metal is usually about 1.2% of the weight of the catalyst.

The transition metal oxide may be any Group 6 oxide, typically $MoO_3$.

The transition metal oxide may be between about 0.5% and 15% of the catalyst weight.

The transition metal oxide may be between about 1.5% and 12% of the catalyst weight.

Typically the transition metal oxide is about 2% of the catalyst weight.

In one embodiment the catalyst is $Pt/MoO_3/Al_2O_3SiO_2$ having about 1.2 wt % Pt and about 2 wt % $MoO_3$, and a $SiO_2$ to $Al_2O_3$ weight ratio of about 3:1.

The catalyst is a non-sulphided catalyst.

The process may be carried out at a temperature of between 250° C. and 450° C.

The process may be carried out at a temperature of between 330° C. and 390° C.

The process may be carried out at temperature of between about 350° C. and 380° C.

Typically the process is carried out at between 360° C. to 370°, usually 370° C.

The process may be carried out a pressure of between 10 and 200 Bar, although a typical range is between 15 and 70 Bar.

The process may be carried out at 70 Bar where a high diesel to naphtha ratio of above 6 is required at a conversion rate of above 60%.

The process may be carried out at a pressure of about 70 Bar and at a temperature of about 370° C. to give a diesel to naphtha ratio of about 6.4 at a conversion of about 70%, said diesel having a cloud point of about −19° C.

The process may be carried out with a volumetric $H_2$ to hydrocarbon feed ratio of between 800:1 and 3000:1, typically 1000:1 to 1500:1.

The process may be carried out with a weight hourly space velocity (whsv) of between 0.25 h$^{-1}$ and 1.5 h$^{-1}$, typically 0.5 h$^{-1}$ and 1 h$^{-1}$.

The conversion to diesel may be at least 60%, typically 70% and even as high as 80%.

Typically the hydrocarbon feed is predominantly a wax feed, for example a Fischer-Tropsch wax.

The Fischer-Tropsch wax may be selected from a Group including
a primary FT reactor product;
wax A, or distillation fractions thereof;
wax B;
wax C wherein waxes A, B and C have characteristics as set out in the table below.

Wax Characteristics:

| Wax Type | Congealing point (° C.) | Substantial carbon distribution |
|---|---|---|
| A | 83-103, typically 93 | $C_5$-$C_{120}$ |
| B | 49-69, typically 59 | $C_{17}$-$C_{45}$ |
| C | 71-91, typically 81 | $C_{30}$-$C_{85}$ |

The invention extends to a diesel produced by the process of the invention, the diesel having a cetane number in excess of 40.

The diesel may have a cetane number between 65 and 75, typically 70.

The diesel may have a cloud point below −19° C.

Typically the diesel has a cloud point below −25° C.

SPECIFIC DESCRIPTION OF THE INVENTION

CATALYST EXAMPLE 1

A non-sulphided $Pt/MoO_3/Al_2O_3$—$SiO_2$ catalyst was prepared in which the support was amorphous. The particle size of the catalyst was ⅛".

Catalyst Preparation.

75% Degussa silica (300 grams), 25% Degussa alumina (100 grams) and $HNO_3$ 55% (100 ml) were introduced into a mixer. While mixing, distilled water was added drop wise until a stiff dough was obtained. The paste was kneaded for about 3 hours.

At the end of the reaction, the mixture was placed in an oven at 120° C. for 10 hours in order to ensure proper drying, then pelletised to 3000 and 6000 micrometers.

Following this, the support was calcined in air at 550° C. for 3 hours.

100 grams of the support was impregnated with 100 ml of $(NH_4)_6Mo_7O_{24}.4H_2O$ (2.4525 grams) solution until a 2.2% $MoO_3$ content was loaded. The mixture was calcined in air at 400° C. for 4 hours. Then 100 grams of the mixture was impregnated with 100 ml of $[Pt(NH_3)_4](NO_3)_2$ (1.9846 grams) solution until a 1.2% Pt content was loaded; then the catalyst was calcined at 400° C. in air for 4 hours in order to eliminate all the $NH_3$ and to obtain the desired oxide $MoO_3$.

Reduction of the Catalyst

The catalyst was reduced in-situ in a fixed bed at 350° C. for 8 hours with a hydrogen flow rate of 1.7 l/min in order to reduce the platinum.

Catalyst Testing Apparatus

The catalyst testing was carried out in a fixed bed reactor operating in down flow mode.

Other Apparatus and Techniques Used for Catalyst Characterization

BET Surface Area Measurements and Data

A Gemini micromeritics surface area machine was used. BET data of the catalyst was obtained. Catalyst characteristics are summarized in table A below.

TABLE A

| Catalyst Characteristics | | | | | | | |
|---|---|---|---|---|---|---|---|
| A | B | C | D | E | F | G | H |
| Pt/MoO$_3$/Al$_2$O$_3$—SiO$_2$ | 1.2% Pt<br>2.2% MoO$_3$ | 65.1% SiO$_2$<br>19% Al$_2$O$_3$ | 233 | 0.55 | 0.38 | 100 | 0.44 |

A: catalyst with particle size: ⅛".
B: active agents.
C: carrier
D: BET surface area (m$^2$/g)
E: total pore volume (cm$^3$/g)
F: acid sites (mmol NH$_3$/g cat)
G: average pore diameter (Angström)
H: Brönsted/Lewis (B/L)

Inductive Couple Plasma (ICP)

The amorphous support (Al$_2$O$_3$—SiO$_2$) was impregnated with a metal oxide (MoO$_3$) and a noble metal (Pt) and metal loadings were ascertained by means of ICP.

The analyses were performed by AARL. ICP data for Pt/MoO$_3$/Al$_2$O$_3$—SiO$_2$ was obtained. The results are given in table B below.

TABLE B

| Percentage of metal loading on the Al$_2$O$_3$—SiO$_3$ | | |
|---|---|---|
| | Percentage of Metal loading | |
| Sample | % added | % found |
| Pt/MoO$_3$/Al$_2$O$_3$—SiO$_2$ | 1.3% Pt/<br>2.3% MoO$_3$ | 1.2% Pt/<br>2.2% MoO$_3$ |

X-Ray Diffraction (XRD)

A Siemens D500 X-ray Powder Diffractometer was used to determine the crystallinity of the catalyst and the catalyst was found to be classifiable as amorphous.

Temperature Program Reduction (TPR)

A Micromeritics TPR 2900 analyzer was used. The catalyst was reduced at 350° C.

Temperature Program Desorption (TPD)

A Micromeritics TPD 2900 NH$_3$ analyzer was used for the determination of the catalyst acidity.

Catalyst Use

Tests to convert a Fischer-Tropsch reaction product wax to diesel and naphtha using the catalyst described above were performed at 370° C. in a fixed bed reactor without recycle.

Tests were also conducted to convert a Fischer-Tropsch reaction product to diesel and naphtha using the prior art Ni-W or Ni-Mo catalysts at 370° C. in a fixed bed reactor without recycle.

The results showed that the catalyst of the invention gave superior results of a diesel to naphtha ratio of 6.4:1 and a conversion (C$_{23+}$ converted in product) of 70%, the diesel having an acceptable cloud point of about −19° C.

The catalyst was also found not to have decreased in activity or performance after 190 days of constant use whereas the prior art catalysts are known to have a gradual decrease in activity from the first day of use until the catalyst must be replaced.

PROCESS EXAMPLE 1

An amorphous catalyst having the properties as set out in tables 1 and 2 below and originally designed for the conversion of waxes to lube oils was prepared and used in a hydrocracking process to convert a Fischer-Tropsch wax C to diesel. Wax C has a congealing point of 81° C. and a substantial carbon distribution of C$_{30}$ to C$_{85}$, as shown in the table above.

TABLE 1

| Catalyst Characteristics | | | | | | | |
|---|---|---|---|---|---|---|---|
| A | B | C | D | E | F | G | H |
| Pt/MoO$_3$/Al$_2$O$_3$—SiO$_2$ | 1.2% Pt<br>2.2% MoO$_3$ | 65.1% SiO$_2$<br>19% Al$_2$O$_3$ | 219 | 0.55 | 0.38 | 100 | 0.44 |

A: catalyst with particle size: ⅛" and catalyst bulk density between 0.2 and 2.5
B: active agents.
C: carrier
D: BET surface area (m$^2$/g)
E: total pore volume (cm$^3$/g)
F: acid sites (mmol NH$_3$/g cat)
G: average pore diameter, Angström (Å)
H: Brönsted/Lewis (B/L)

TABLE 2

| Percentage of metal loading on the Al$_2$O$_3$—SiO$_3$ | | |
|---|---|---|
| | Percentage of Metal loaded | |
| Sample | % added | % found |
| Pt/MoO$_3$/Al$_2$O$_3$—SiO$_2$ | 1.3% Pt/<br>2.3% MoO$_3$ | 1.2% Pt/<br>2.2% MoO$_3$ |

Temperature Program Reduction (TPR)

A Micromeritics TPR 2900 analyzer was used. The catalyst was reduced at 350° C.

Temperature Program Desorption (TPD)

A Micromeritics TPD 2900 NH$_3$ analyser was used for the determination of the catalyst acidity.

Gas Chromatography (GC)

A GC was used to identify and to determine the carbon number distribution of the products. The analyses were performed by Instrumental Techniques laboratory.

Nuclear Magnetic Resonance (NMR)

A Varian Unity Inova 400 mHz NMR was used to determine the cetane number of the diesel fraction.

Catalyst Use

Tests to convert a Fischer-Tropsch wax having a liquid point of 80° C. (wax C) to diesel were performed under a variety of conditions. The tests were conducted at pressures of 35 bar, 50 bar and 70 bar.

A summary of reactions performed is given in tables 3, 4 and 5.

Reactions were also performed with hydrocracked bottoms (HB) ">370° C." from wax C (HB) as feedstock. A summary of the experiments performed using HB as feedstock is shown in table 6.

The diesel fraction produced 170°-370° C. during the experiments were fractionated according to the true boiling point (TBP) while the specification requires a diesel cut 170°-370° C. according to the ASTM D-86.

The diesel fraction of 170°-370° C. in TBP corresponds almost to 190°-390° C. in ASTM-D86; therefore all flash points values resulted from the test runs were too high as the initial boiling point of the diesel were shifted by almost 20° C.

Wax C Conversion Over $Pt/MoO_3/Al_2O_3$—$SiO_2$ Catalyst

Wax C at a flow rate of 0.9-1.9 ml/min and $H_2$ at a flow rate of 1.4-2.6 Nl/min were passed through $Pt/MoO_3/Al_2O_3$—$SiO_2$ catalyst (96.2 g) in the reactor.

Separate runs were carded out at various pressures (35 bar, 50 bar and 70 bar) and various temperatures (360° C., 365° C. and 370° C.).

The results obtained after 3-4 days run at each temperature and pressure are shown in tables 3, 4 and 5.

TABLE 3

The effect of temperature on diesel selectivity and diesel properties at 50 bar, whsv of 0.5 $h^{-1}$ and $H_2$/wax of 1400.

|  | Specifications | Run R 08 | R 09 | R 10 |
|---|---|---|---|---|
| Pressure (bar) |  | 50 | 50 | 50 |
| Temperature (° C.) |  | 370 | 365 | 360 |
| Whsv ($h^{-1}$) |  | 0.5 | 0.5 | 0.5 |
| $H_2$:wax |  | 1432 | 1427 | 1467 |
| Conversion$_D$ (%) |  | 84.4 | 78.9 | 58 |
| $S_{C1-C4}$ (%) |  | 4.3 | 4.5 | 2.3 |
| $S_{C5-C9}$ (%) |  | 21.5 | 20.7 | 16.4 |
| $S_{C10-C22}$ (%) |  | 74.2 | 74.8 | 81.3 |
| $Y_{C1-C4}$ (%) |  | 3.6 | 3.6 | 1.3 |
| $Y_{C5-C9}$ (%) |  | 18.1 | 16.3 | 9.5 |
| $Y_{C10-C22}$ (%) |  | 62.6 | 59 | 47.2 |
| Residue (%) |  | 15.6 | 21.1 | 42 |
| Diesel/naphtha |  | 3.5 | 3.6 | 5 |
| Diesel Properties |  |  |  |  |
| iP/nP in $C_{10}$-$C_{22}$ |  | 7.7 | 6.4 | 7.3 |
| Cloud point (° C.) | (−19° C.) max | −25 | −9 | −3 |
| Flash point (° C.) | 57 min | 84 | 84 | 78 |
| Viscosity @ 40° C. | 2.0 < cSt < 5.3 | 2.6 | 2.7 | 3.2 |
| Density @ 20° C. | 0.766 g/cm$^3$ | 0.775 | 0.777 | 0.781 |
| Cetane number | 70 min | 71 | 72 | 73 |

Conversion$_D$ (%) = ($C_{23+}$ in fresh feed − $C_{23+}$ in product)/$C_{23+}$ in fresh feed * 100 from Carbon Number Distribution (CND)
$S_{C10-C22}$ (%) = Diesel selectivity calculated as: ($C_{10}$-$C_{22}$ in product − $C_{10}$-$C_{22}$ in fresh feed)/($C_1$-$C_{22}$ in product − $C_1$-$C_{22}$ in fresh feed) * 100
$Y_{C10-C22}$ (%) = Diesel yield calculated as: conversion$_D$ * $S_{C10-C22}$ Conversion of Wax C at 50 Bar As regards the quality of the products, the diesel fraction ($C_{10-22}$) produced presents excellent properties. An average ratio $iC_{10-22}/nC_{10-22}$ of 7/1 has been obtained. This high ratio explains the cloud point of −25° C. A diesel cetane number of 71 was found.

TABLE 4

Effect of temperature on diesel selectivity and diesel properties at 35 bar, whsv of 0.5 $h^{-1}$ and $H_2$/wax of 1400

|  | Run R 11 | R 12 | R 13 |
|---|---|---|---|
| Catalyst | Pt/Mo/Al—Si | Pt/Mo/Al—Si | Pt/Mo/Al—Si |
| Pressure (bar) | 35 | 35 | 35 |
| Temperature (° C.) | 360 | 365 | 370 |
| Whsv ($h^{-1}$) | 0.5 | 0.5 | 0.5 |
| $H_2$:wax | 1353 | 1452 | 1507 |
| Conversion$_D$ (%) | 72.8 | 85.5 | 95.2 |
| $Y_{C1-C4}$ (%) | 1.0 | 3.7 | 2.0 |
| $Y_{C5-C9}$ (%) | 14.6 | 19.7 | 29.3 |
| $Y_{C10-C22}$ (%) | 57.3 | 62.2 | 64.0 |
| Residue (%) | 27.1 | 14.4 | 4.7 |
| Diesel/naphtha | 3.9 | 3.2 | 2.2 |
| Diesel Properties |  |  |  |
| iP/Np in $C_{10}$-$C_{22}$ | 4.8 | 7.9 | 6 |
| Cloud point (° C.) | −29 | −34 | −39 |
| CFPP (° C.) | −34 | −39 | <−39 |
| Flash point (° C.) | 88 | 80 | 75 |
| Viscosity @ 40° C. | 2.5 | 2.7 | 2.2 |
| Density @ 20° C. | 0.776 | 0.777 | 0.771 |
| Cetane number | 72 | 73 | 69 |

Conversion of Wax C at 370° C.

From table 5 the following points may be observed:
It was found that by lowering the pressure from 70 bar to 35 bar the
conversion increases
cold properties improve i.e. cloud point at 70 bar was −6° C. decreasing to −39° C. at 35 bar as can be seen from table 5.

The Cetane number, which measures the ignition quality of a diesel fuel, remained high and almost unchanged at low pressure. This can be explained by the insignificant aromatic content in the diesel (below 1%).

TABLE 5

The effect of pressure on diesel selectivity and diesel properties at 370° C., whsv of 0.5 $h^{-1}$ and $H_2$/wax of 1400.

|  | Run R 07 | R 08 | R 13 |
|---|---|---|---|
| Pressure (bar) | 70 | 50 | 35 |
| Temperature (° C.) | 370 | 370 | 370 |
| Whsv ($h^{-1}$) | 0.5 | 0.5 | 0.5 |
| $H_2$:wax | 1327 | 1432 | 1507 |
| Conversion$_D$ (%) | 48.7 | 84.4 | 95.2 |
| $Y_{C1-C4}$ (%) | 2.6 | 3.6 | 2.0 |
| $Y_{C5-C9}$ (%) | 8.2 | 18.1 | 29.3 |
| $Y_{C10-C22}$ (%) | 37.8 | 62.6 | 64.0 |
| Residue (%) | 51.3 | 15.6 | 4.7 |
| Diesel/naphtha | 4.6 | 3.5 | 2.2 |
| Diesel Properties |  |  |  |
| iP/nP in $C_{10}$-$C_{22}$ | 4.6 | 7.7 | 6 |
| Cloud point (° C.) | −6 | −25 | −39 |
| CFPP (° C.) |  |  | <−39 |
| Flash point (° C.) | 86 | 84 | 75 |
| Viscosity @ 40° C. | 2.7 | 2.6 | 2.2 |

TABLE 5-continued

The effect of pressure on diesel selectivity and diesel properties at 370° C., whsv of 0.5 h$^{-1}$ and H$_2$/wax of 1400.

| | Run | | |
|---|---|---|---|
| | R 07 | R 08 | R 13 |
| Density @ 20° C. | 0.777 | 0.775 | 0.771 |
| Cetane number | 72 | 71 | 69 |

Conversion of Hydrocracked Bottoms (">370° C.") over a Pt/MoO$_3$/Al$_2$O$_3$—SiO$_2$ Catalyst.

A study was also undertaken in which hydrocracked bottoms (HB, ">370° C.") from wax C was used as feedstock. The purpose of this was to assess the product yielded and its quality.

Feed at a rate of 0.9-1.9 ml/min and H$_2$ at a flow rate of 1.4-2.6 Nl/min were passed through a Pt/MoO$_3$/Al$_2$O$_3$—SiO$_2$ catalyst (96.2 g) bed in the reactor.

Reactions were performed at two different temperatures, keeping other parameters constant. The results of the runs carried out at temperatures of 350° C. and 340° C., a pressure of 35 bar, a whsv of 0.5 h$^{-1}$ and a H$_2$/wax of 1200 are shown in table 6.

TABLE 6

The effect of the hydrocracked Wax C bottoms (material >370° C.) on diesel selectivity and diesel properties.

| | Run | |
|---|---|---|
| | R 15 | R 16 |
| Pressure (bar) | 35 | 35 |
| Temperature (° C.) | 350 | 340 |
| Whsv (h$^{-1}$) | 0.53 | 0.55 |
| H$_2$:wax | 1215 | 1209 |
| Conversion$_D$ (%) | 93.7 | 54.8 |
| Y$_{C1-C4}$ (%) | 2.7 | 1.1 |
| Y$_{C5-C9}$ (%) | 15.6 | 9.2 |
| Y$_{C10-C22}$ (%) | 75.5 | 44.5 |
| Residue (%) | 6.3 | 45.3 |
| Diesel/naphtha | 5 | 5 |
| Diesel Properties | | |
| iP/nP in C$_{10}$-C$_{22}$ | 7.8 | 6.2 |
| Cloud point (° C.) | −21 | −28 |
| CFPP (° C.) | | −38 |
| Flash point (° C.) | 89 | 97 |
| Viscosity @ 40° C. | 2.75 | 3.16 |
| Density @ 20° C. | 0.775 | 0.802 |
| Cetane number | 70 | 72 |

Conversion of Hydrocracked Bottoms Wax C (bp>370° C.) Using the Pt/Mo Silica-Alumina Catalyst The reactor temperature was set to 350° C. and was then reduced to 340° C. to avoid an overcracking of the hydrocracked wax C feedstock as it contains significant amount of iso-paraffins.

It can be noticed that at a conversion of 93.7% as well as 54.8% excellent cold properties have been obtained in both runs (−21° C. & −28° C.) combined with high cetane number (70 & 72). The effect of conversion on cloud point was out of correlation i.e. at 93.7% conversion, it is expected a cloud point much lower than at 54.8% conversion. The explanation could be that molecular rearrangements in the iso-paraffins structures might happen. Overcracking of the highly branched iso-paraffins might affect the diesel cold properties.

PROCESS EXAMPLE 2

An amorphous catalyst having the properties as set out in tables 1 and 2 of Process Example 1 was prepared and used in a hydrocracking process to convert a Fischer-Tropsch wax known as Wax A to diesel. Wax A has a congealing point of 91° C. and a substantial carbon distribution of C$_5$ to C$_{120}$.

The amorphous non-sulphided, Pt/MoO$_3$/Al$_2$O$_3$—SiO$_2$ was used to hydrocrack Wax A with the objective to evaluate the catalyst for hydroisomerisation of waxes to lube base oils.

Surprisingly, the catalyst showed a good activity and a good selectivity towards diesel. The activity of the catalyst was further tested using the full range Fischer-Tropsch wax as feedstock.

Catalyst Use

Reactions to convert Wax A to diesel were performed under a variety of conditions. A pressure range of 35 bar, 50 bar and 70 bar, a temperature range of 365° C., 370° C. and 380° C., a weight hourly space velocity (whsv) of 0.5 h$^{-1}$, and a H$_2$/wax range of 1000, 1200 and 1300 were covered in the study.

A summary of reactions performed is given in table 7.

Typical experimental details are given below.

Wax a Conversion Using the Pt/MoO$_3$/Al$_2$O$_3$—SiO$_2$ Catalyst

Wax A at a flow rate of 0.9-1.9 ml/min and H$_2$ at a flow rate of 1.4-2.6 Nl/min was passed through Pt/MoO$_3$/Al$_2$O$_3$—SiO$_2$ catalyst (96.2 g) in the reactor.

TABLE 7

The effect of temperature on diesel selectivity and diesel properties at 70 bar and whsv of 0.5 h$^{-1}$

| | Run | |
|---|---|---|
| | R 27 | R 28 |
| Pressure (bar) | 70 | 70 |
| Temperature © | 370 | 380 |
| WHSV (h$^{-1}$) | 0.5 | 0.5 |
| H$_2$:wax | 1221 | 1242 |
| Conversion (%) | 70.1 | 79.5 |
| Y$_{C1-C4}$ (%) | 1.2 | 1.3 |
| Y$_{C5-C9}$ (%) | 9.3 | 18.8 |
| Y$_{C10-C22}$ (%) | 59.6 | 59.4 |
| Residue (%) | 29.9 | 20.5 |
| Diesel/naphtha | 6.4 | 3.2 |
| Diesel Properties | | |
| iP/nP in C$_{10}$-C$_{22}$ | 3.9 | 4.1 |
| Cloud point (° C.) | −19 | −20 |
| Cetane number | 70 | 69 |

PROCESS EXAMPLE 3

An amorphous non-sulphided catalyst having the properties as set out in tables 1 and 2 of Example 1, Pt/MoO$_3$/Al$_2$O$_3$—SiO$_2$, was used to convert Wax B with the objective to evaluate the catalyst for hydroisomerisation of waxes to lube base oils. Surprisingly the catalyst showed a good activity and a good selectivity towards diesel. Wax B has a congealing point of 59° C. and a substantial carbon distribution of C$_{17}$ to C$_{45}$.

It was found, to the surprise of the applicant, that the prepared Pt/MoO$_3$/Al$_2$O$_3$—SiO$_2$ catalyst produces an excellent diesel comparable to the diesel quality obtained by hydrocracking Fischer-Tropsch (FT) waxes using other commercially available amorphous hydrocracking catalysts.

Catalyst Use

Wax B was converted to diesel under a variety of conditions. A pressure range of 15 bar, 35 bar, 50 bar and 70 bar, a temperature range of 350° C. to 380° C., a weight hourly space velocity (whsv) range of 0.5 h$^{-1}$ and a H$_2$/wax range of 1000, 1200 and 3000 were tested with the above catalyst and the reactions performed are given in table 8.

The test work was performed in a bench scale fixed bed reactor.

Wax B Conversion Over Pt/MoO$_3$/Al$_2$O$_3$—SiO$_2$

Wax B at a flow rate of 0.054-0.114 l/h, H$_2$ at a flow rate of 84-156 Nl/h was passed over the Pt/MoO$_3$/Al$_2$O$_3$—SiO$_2$ catalyst (96.2 g) in the reactor.

Reactions were carried out at various pressures (15 bar, 35 bar, 50 bar and 70 bar), various temperatures (350° C., 360° C., 365° C., 370° C. & 380° C.), whsv (0.5 h$^{-1}$) and various H$_2$/wax ratios (1000, 1200 and 3000). The results obtained after stabilising the reactor for 3-4 days at given temperature and pressure are shown in table 8.

TABLE 8

The effect of temperature on diesel selectivity and diesel properties at 35 bar, a H$_2$/wax ratio of 1200 and whsv of 0.5 h$^{-1}$

| | Run | | |
|---|---|---|---|
| | R 40 | R 37 | R 38 |
| Pressure (bar) | 35 | 35 | 35 |
| Temperature (° C.) | 350 | 360 | 365 |
| WHSV (h$^{-1}$) | 0.5 | 0.5 | 0.5 |
| H$_2$:wax | 1215 | 1238 | 1302 |
| Conversion (%) | 16.6 | 69.0 | 86.4 |
| Y$_{C1-C4}$ (%) | 0.3 | 0.8 | 1.8 |
| Y$_{C5-C9}$ (%) | 1.6 | 15.2 | 21.2 |
| Y$_{C10-C22}$ (%) | 14.6 | 53 | 63.3 |
| Residue (%) | 83.4 | 31 | 13.6 |
| Diesel/naphtha | 8.9 | 3.5 | 3.0 |
| Diesel Properties | | | |
| iP/nP in C$_{10}$-C$_{22}$ | 3.3 | 4.6 | 5.3 |
| Cloud point (° C.) | −9 | −18 | −17 |
| CFPP (° C.) | | −20 | −25 |
| Cetane number | 75 | 71 | 70 |

The invention claimed is:

1. An amorphous hydrocracking catalyst for conversion of at least a portion of a hydrocarbon feed having a fraction above the diesel boiling range to diesel, said catalyst consisting essentially of:

an Al$_2$O$_3$—SiO$_2$ support;

a noble catalytically active metal which is active at least for the hydrocracking of a hydrocarbon above the diesel boiling range; and a transition metal oxide wherein the transition metal is selected from Group V and Group VI transition metals; wherein the transition metal oxide is between about 1.5% and about 12% of the catalyst weight.

2. A catalyst as claimed in claim 1, wherein the ratio of SiO$_2$ to Al$_2$O$_3$ in the support is between 1:4 and 4:1.

3. A catalyst as claimed in claim 1, wherein the catalytically active noble metal is present at between 0.1% to 2.0% of the weight of the catalyst.

4. A catalyst as claimed in claim 1, wherein the catalytically active noble metal is Pt, Pd, Ir or Rh.

5. A catalyst as claimed in claim 4, wherein the catalytically active noble metal is Pt.

6. A catalyst as claimed in claim 1, wherein the transition metal oxide is a Group VI transition metal oxide.

7. A catalyst as claimed in claim 6, wherein the transition metal oxide is MoO$_3$.

8. A catalyst as claimed in claim 1, wherein the catalyst is a non-sulphided catalyst.

9. A catalyst as claimed in claim 1, wherein the catalyst is an amorphous hydrocracking catalyst for conversion of at least a portion of a hydrocarbon feed having a fraction above the diesel boiling range to diesel, wherein the catalyst is Pt/MoO$_3$/Al$_2$O$_3$SiO$_2$ having about 1.2 wt% Pt and about 2 wt% MoO$_3$, and an SiO$_2$ to Al$_2$O$_3$ weight ratio of about 3:1.

* * * * *